United States Patent
Steffen (10) Patent No.: US 9,641,378 B1
(45) Date of Patent: May 2, 2017

(54) ADJUSTMENT OF COMPRESSION RATIOS FOR DATA STORAGE

(71) Applicant: Western Digital Technologies, Inc., Irvine, CA (US)

(72) Inventor: David N. Steffen, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 408 days.

(21) Appl. No.: 13/797,529

(22) Filed: Mar. 12, 2013

(51) Int. Cl.
*G06F 12/00* (2006.01)
*H04L 29/06* (2006.01)
*G06F 1/32* (2006.01)
*G06F 3/06* (2006.01)
*G06F 12/0802* (2016.01)

(52) U.S. Cl.
CPC ........ *H04L 29/0604* (2013.01); *G06F 1/3203* (2013.01); *G06F 3/068* (2013.01); *G06F 3/0625* (2013.01); *G06F 3/0638* (2013.01); *G06F 12/0802* (2013.01)

(58) Field of Classification Search
None
See application file for complete search history.

(56) References Cited

U.S. PATENT DOCUMENTS

| | | |
|---|---|---|
| 6,856,556 B1 | 2/2005 | Hajeck |
| 7,126,857 B2 | 10/2006 | Hajeck |
| 7,411,757 B2 * | 8/2008 | Chu et al. .......... 360/69 |
| 7,430,136 B2 | 9/2008 | Merry, Jr. et al. |
| 7,447,807 B1 | 11/2008 | Merry et al. |
| 7,502,256 B2 | 3/2009 | Merry, Jr. et al. |
| 7,509,441 B1 | 3/2009 | Merry et al. |
| 7,596,643 B2 | 9/2009 | Merry, Jr. et al. |
| 7,620,773 B2 | 11/2009 | Nicholson et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,733,712 B1 | 6/2010 | Walston et al. |
| 7,765,373 B1 | 7/2010 | Merry et al. |
| 7,898,855 B2 | 3/2011 | Merry, Jr. et al. |
| 7,912,991 B1 | 3/2011 | Merry et al. |
| 7,930,436 B1 * | 4/2011 | Znosko .......... 709/247 |
| 7,936,603 B2 | 5/2011 | Merry, Jr. et al. |
| 7,962,792 B2 | 6/2011 | Diggs et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |

(Continued)

*Primary Examiner* — Reginald Bragdon
*Assistant Examiner* — Michael Westbrook (57) ABSTRACT

Storing data from a volatile memory of a host in a non-volatile memory (NVM) of a data storage device (DSD). Data from the volatile memory of the host is identified which has been compressed with a first compression ratio. The identified data is decompressed and a second compression ratio is determined based on a time to restore the data to the volatile memory of the host and characteristics of the NVM. At least a portion of the decompressed data is recompressed with the second compression ratio and at least a portion of the recompressed data is stored in the NVM.

26 Claims, 9 Drawing Sheets

(56) References Cited

U.S. PATENT DOCUMENTS

| | | | |
|---|---|---|---|
| 8,145,833 B1 * | 3/2012 | Duan | G06F 12/08 711/104 |
| 8,151,020 B2 | 4/2012 | Merry, Jr. et al. | |
| 8,161,227 B1 | 4/2012 | Diggs et al. | |
| 8,166,245 B2 | 4/2012 | Diggs et al. | |
| 8,243,525 B1 | 8/2012 | Kan | |
| 8,254,172 B1 | 8/2012 | Kan | |
| 8,261,012 B2 | 9/2012 | Kan | |
| 8,296,625 B2 | 10/2012 | Diggs et al. | |
| 8,312,207 B2 | 11/2012 | Merry, Jr. et al. | |
| 8,316,176 B1 | 11/2012 | Phan et al. | |
| 8,341,339 B1 | 12/2012 | Boyle et al. | |
| 8,375,151 B1 | 2/2013 | Kan | |
| 8,392,635 B2 | 3/2013 | Booth et al. | |
| 8,397,107 B1 | 3/2013 | Syu et al. | |
| 8,407,449 B1 | 3/2013 | Colon et al. | |
| 8,418,236 B1 * | 4/2013 | Havemose | H04L 63/0823 713/169 |
| 8,423,722 B1 | 4/2013 | Deforest et al. | |
| 8,433,858 B1 | 4/2013 | Diggs et al. | |
| 8,443,167 B1 | 5/2013 | Fallone et al. | |
| 8,447,920 B1 | 5/2013 | Syu | |
| 8,458,435 B1 | 6/2013 | Rainey, III et al. | |
| 8,478,930 B1 | 7/2013 | Syu | |
| 8,489,854 B1 | 7/2013 | Colon et al. | |
| 8,503,237 B1 | 8/2013 | Horn | |
| 8,521,972 B1 | 8/2013 | Boyle et al. | |
| 8,527,467 B2 * | 9/2013 | Shmueli | 707/651 |
| 8,549,236 B2 | 10/2013 | Diggs et al. | |
| 8,566,286 B1 * | 10/2013 | Hawton et al. | 707/654 |
| 8,583,835 B1 | 11/2013 | Kan | |
| 8,601,311 B2 | 12/2013 | Horn | |
| 8,601,313 B1 | 12/2013 | Horn | |
| 8,612,669 B1 | 12/2013 | Syu et al. | |
| 8,612,804 B1 | 12/2013 | Kang et al. | |
| 8,615,681 B2 | 12/2013 | Horn | |
| 8,638,602 B1 | 1/2014 | Horn | |
| 8,639,872 B1 | 1/2014 | Boyle et al. | |
| 8,683,113 B2 | 3/2014 | Abasto et al. | |
| 8,694,814 B1 * | 4/2014 | Salomon et al. | 713/323 |
| 8,700,834 B2 | 4/2014 | Horn et al. | |
| 8,700,950 B1 | 4/2014 | Syu | |
| 8,700,951 B1 | 4/2014 | Call et al. | |
| 8,706,985 B1 | 4/2014 | Boyle et al. | |
| 8,707,104 B1 | 4/2014 | Jean | |
| 8,745,277 B2 | 6/2014 | Kan | |
| 2003/0081938 A1 * | 5/2003 | Nishimura | G11B 27/034 386/279 |
| 2004/0003223 A1 * | 1/2004 | Fortin et al. | 713/1 |
| 2005/0210519 A1 * | 9/2005 | Ito | H04N 5/76 725/89 |
| 2006/0275023 A1 * | 12/2006 | Perlman et al. | 386/112 |
| 2008/0253330 A1 * | 10/2008 | Bartlett | 370/331 |
| 2009/0327608 A1 | 12/2009 | Eschmann et al. | |
| 2010/0058007 A1 * | 3/2010 | Yamauchi | 711/156 |
| 2010/0174849 A1 | 7/2010 | Walston et al. | |
| 2010/0250793 A1 | 9/2010 | Syu | |
| 2011/0099323 A1 | 4/2011 | Syu | |
| 2011/0283049 A1 | 11/2011 | Kang et al. | |
| 2012/0144111 A1 * | 6/2012 | Weber et al. | 711/114 |
| 2012/0221875 A1 * | 8/2012 | Bak et al. | 713/323 |
| 2012/0260020 A1 | 10/2012 | Suryabudi et al. | |
| 2012/0278531 A1 | 11/2012 | Horn | |
| 2012/0284460 A1 | 11/2012 | Guda | |
| 2012/0324191 A1 | 12/2012 | Strange et al. | |
| 2013/0132638 A1 | 5/2013 | Horn et al. | |
| 2013/0145106 A1 | 6/2013 | Kan | |
| 2013/0275396 A1 * | 10/2013 | Condict et al. | 707/693 |
| 2013/0290793 A1 | 10/2013 | Booth et al. | |
| 2014/0059405 A1 | 2/2014 | Syu et al. | |
| 2014/0115427 A1 | 4/2014 | Lu | |
| 2014/0133220 A1 | 5/2014 | Danilak et al. | |
| 2014/0136753 A1 | 5/2014 | Tomlin et al. | |
| 2014/0164675 A1 * | 6/2014 | Ehrlich et al. | 711/103 |

* cited by examiner

ADJUSTMENT OF COMPRESSION RATIOS FOR DATA STORAGE

BACKGROUND

Data storage devices (DSDs) are often used to record data on or to reproduce data from a recording media. DSDs can include different types of non-volatile memory (NVM) for storing data. One type of NVM includes a rotating magnetic disk. In addition to a magnetic disk, a DSD can include a second type of NVM, such as a solid state NVM. DSDs including both a magnetic disk and a solid state NVM are often referred to as a hybrid drive. Because different types of NVM have different performance characteristics, strategies for storing data may vary depending on the type of NVM used.

One example is during a hibernate process of a computer system. Before turning off power, a computer system may perform a hibernate process to preserve a state of the computer system in an NVM. When power is later restored to the computer system, an operating system of the computer system performs a resume process to restore the computer system to the same state as before hibernation. A solid state NVM, such as flash memory, should be generally capable of a relatively quick resumption after hibernation because of the high read transfer rate associated with flash memory.

Unfortunately, flash memory suffers from endurance issues that cause flash memory to wear out from repeated use. As a result, some operating systems implement a computationally intensive compression of hibernate data to reduce the size of the hibernate data in an effort to reduce wear on the flash memory caused by repeatedly storing hibernate data. Although a high compression of hibernate data may help preserve the life of flash memory, such high compression can undesirably prolong the time it takes to resume from hibernation since the hibernate data must be decompressed from a highly compressed state.

Magnetic disks generally do not suffer from the endurance issues noted above for flash memory and therefore an operating system may not compress hibernate data stored to a magnetic disk as highly as hibernate data stored to a flash memory. However, magnetic disks suffer from a relatively long time to ready while the magnetic disk "spins up," resulting in slower transfer rates than for flash media. As with the prolonged resumption discussed above for flash memory, the slower transfer rate of a magnetic disk can result in an undesirable long resumption time.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed. Reference numbers are reused throughout the drawings to indicate correspondence between referenced elements.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Figure 1:
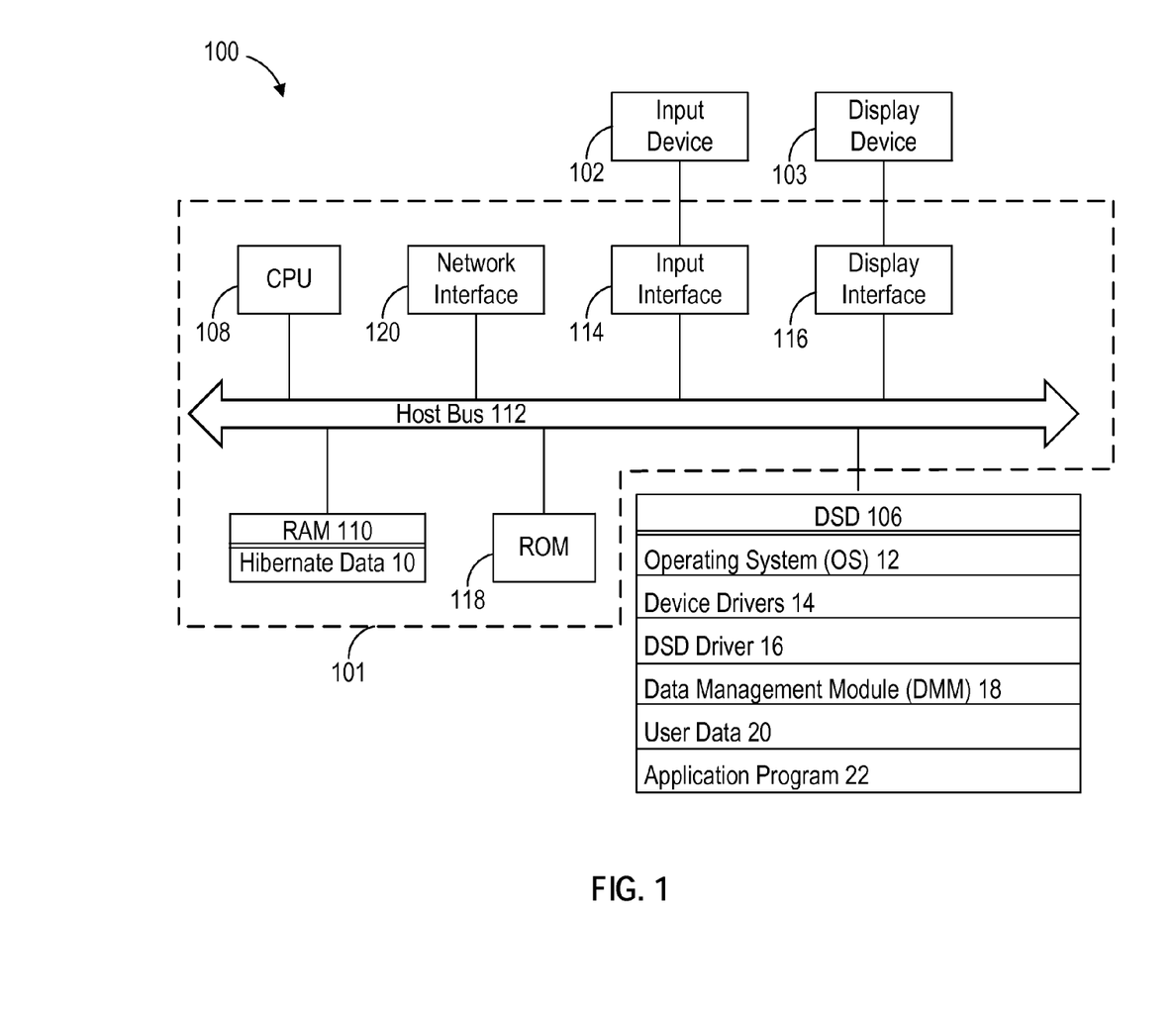
FIG. 1 is a block diagram depicting a computer system including a host and a data storage device (DSD) according to an embodiment.

FIG. 1 shows computer system 100 which includes host 101, input device 102, display device 103 and data storage device (DSD) 106. Computer system 100 can be, for example, a computer system (e.g., desktop, mobile/laptop, tablet, smartphone, etc.) or other electronic device. In this regard, computer system 100 may be a stand-alone system or part of a network. Input device 102 can be a keyboard, scroll wheel, or pointing device allowing a user of computer system 100 to enter information and commands to computer system 100, or to allow a user to manipulate objects displayed on display device 103. In other embodiments, input device 102 and display device 103 can be combined into a single component, such as a touch-screen that displays objects and receives user input.

In the embodiment of FIG. 1, host 101 includes central processing unit (CPU) 108 which can be implemented using one or more processors for executing instructions including a microcontroller, a Digital Signal Processor (DSP), an Application Specific Integrated Circuit (ASIC), a Field Programmable Gate Array (FPGA), hard-wired logic, analog circuitry and/or a combination thereof. CPU 108 interfaces with host bus 112. Also interfacing with host bus 112 are random access memory (RAM) 110, input interface 114 for input device 102, display interface 116 for display device 103, read only memory (ROM) 118, network interface 120 and DSD 106.

RAM 110 is a volatile memory of host 101 that interfaces with host bus 112 so as to provide information stored in RAM 110 to CPU 108 during execution of instructions in software programs such as operating system (OS) 12, application program 22, device drivers 14, and DSD driver 16. More specifically, CPU 108 first loads computer-executable instructions from DSD 106 or another data storage device into a region of RAM 110. CPU 108 can then execute the stored process instructions from RAM 110. Data such as data to be stored in DSD 106 or data retrieved from DSD 106 can also be stored in RAM 110 so that the data can be accessed by CPU 108 during execution of software programs to the extent that such software programs have a need to access and/or modify the data.

In this regard, RAM 110 in the example of FIG. 1 includes hibernate data 10 which provides a state of computer system 100 for a hibernation process. Throughout this disclosure, the term "hibernation process" or its variant will be used generically to describe the various scenarios in which some system state data is to be stored in non-volatile memory (NVM). Thus, a "hibernation process" may encompass such scenarios that are referred to by other names such as "sleep," "low-power mode," etc. In some embodiments, the methods described below are applicable to other state-preservation tasks unrelated to power-saving such as state-preservation tasks related to back-up and error recovery. As described in more detail below, hibernate data 10 can be stored in an NVM of DSD 106 to preserve the state of computer system 100 before powering down.

As shown in FIG. 1, DSD 106 stores OS 12, device drivers 14, DSD driver 16, data management module (DMM) 18, user data 20, and application program 22, which can be, for example, a word processing program or a multimedia program. Device drivers 14 can provide software interfaces to devices such as input device 102 and/or display device 103. Similarly, DSD driver 16 can provide a software interface to DSD 106 and can perform some of the processes described below. DMM 18 can be firmware used by DSD 106. Those of ordinary skill in the art will appreciate that DSD 106 can include more or less than those elements shown in FIG. 1 and that the disclosed processes for managing data may be implemented in other environments.

Figure 2:
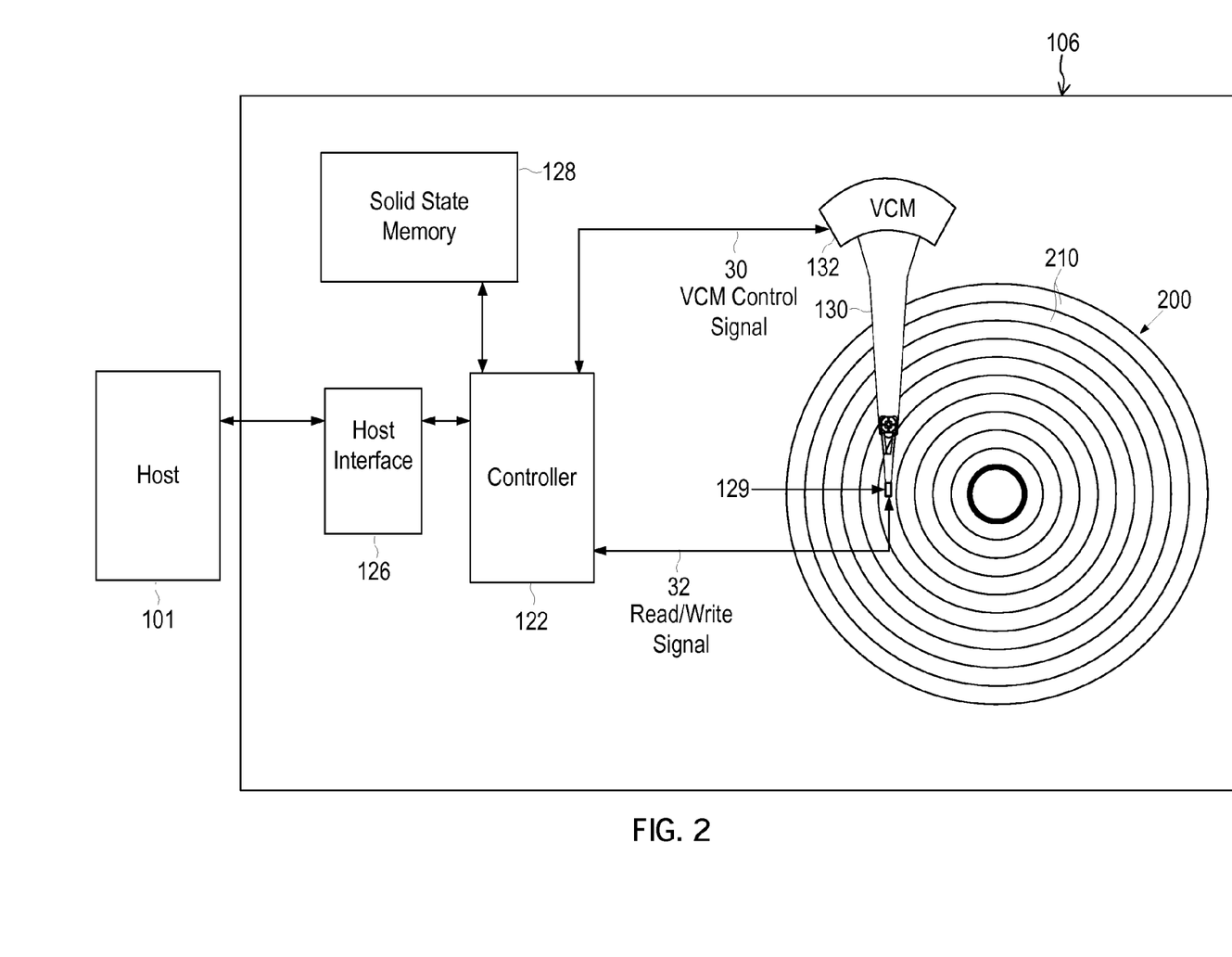
FIG. 2 is a block diagram depicting the DSD of FIG. 1.

FIG. 2 illustrates a block diagram of DSD 106 according to one example embodiment. In the example of FIG. 2, DSD 106 is a hybrid drive including two types of NVM, i.e., magnetic disk 200 and solid state memory 128. In other embodiments, DSD 106 can be a hard disk drive which primarily uses magnetic media for NVM or a solid state storage device which primarily uses solid state media for NVM.

As shown in FIG. 2, DSD 106 includes controller 122 which can perform various operations of DSD 106 described herein. Controller 122 can be implemented using one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof.

In the example of FIG. 2, DSD 106 includes rotating magnetic disk 200 and head 129 connected to the distal end of actuator arm 130 which is rotated about a pivot by voice coil motor (VCM) 132 to position head 129 over disk 200. Head 129 includes at least a read element (not shown) for reading data from disk 200, and a write element (not shown) for writing data on disk 200. Disk 200 comprises a number of radial spaced, concentric tracks 210 for storing data.

DSD 106 also includes solid state memory 128 for storing data. While the description herein refers to solid state memory generally, it is understood that solid state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

Host interface 126 is configured to interface DSD 106 with host 101 and may interface according to a standard such as, for example, PCI express (PCIe), serial advanced technology attachment (SATA), or serial attached SCSI (SAS). As will be appreciated by those of ordinary skill in the art, host interface 126 can be included as part of controller 122. Although FIGS. 1 and 2 depict the co-location of host 101 and DSD 106, in some embodiments the two need not be physically co-located. In some embodiments, DSD 106 may be located remotely from host 101 and connected to host 101 via a network interface.

Figure 3:
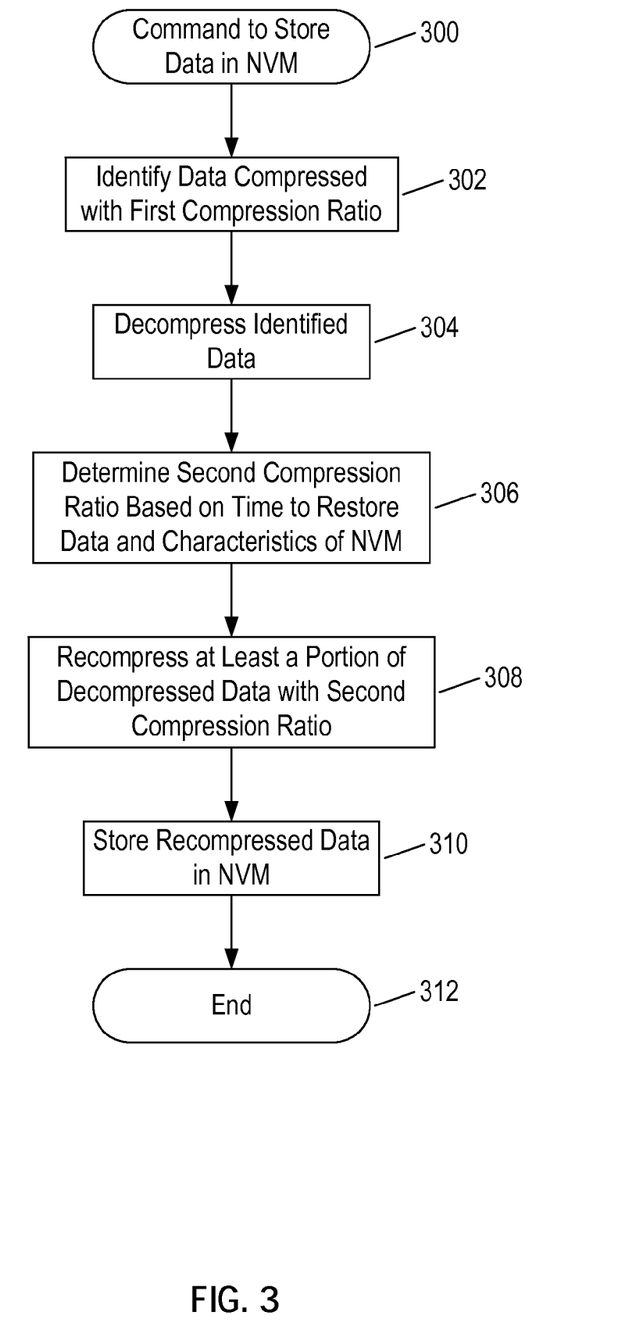
FIG. 3 is a flowchart for a recompression process according to an embodiment.
Figure 4A:
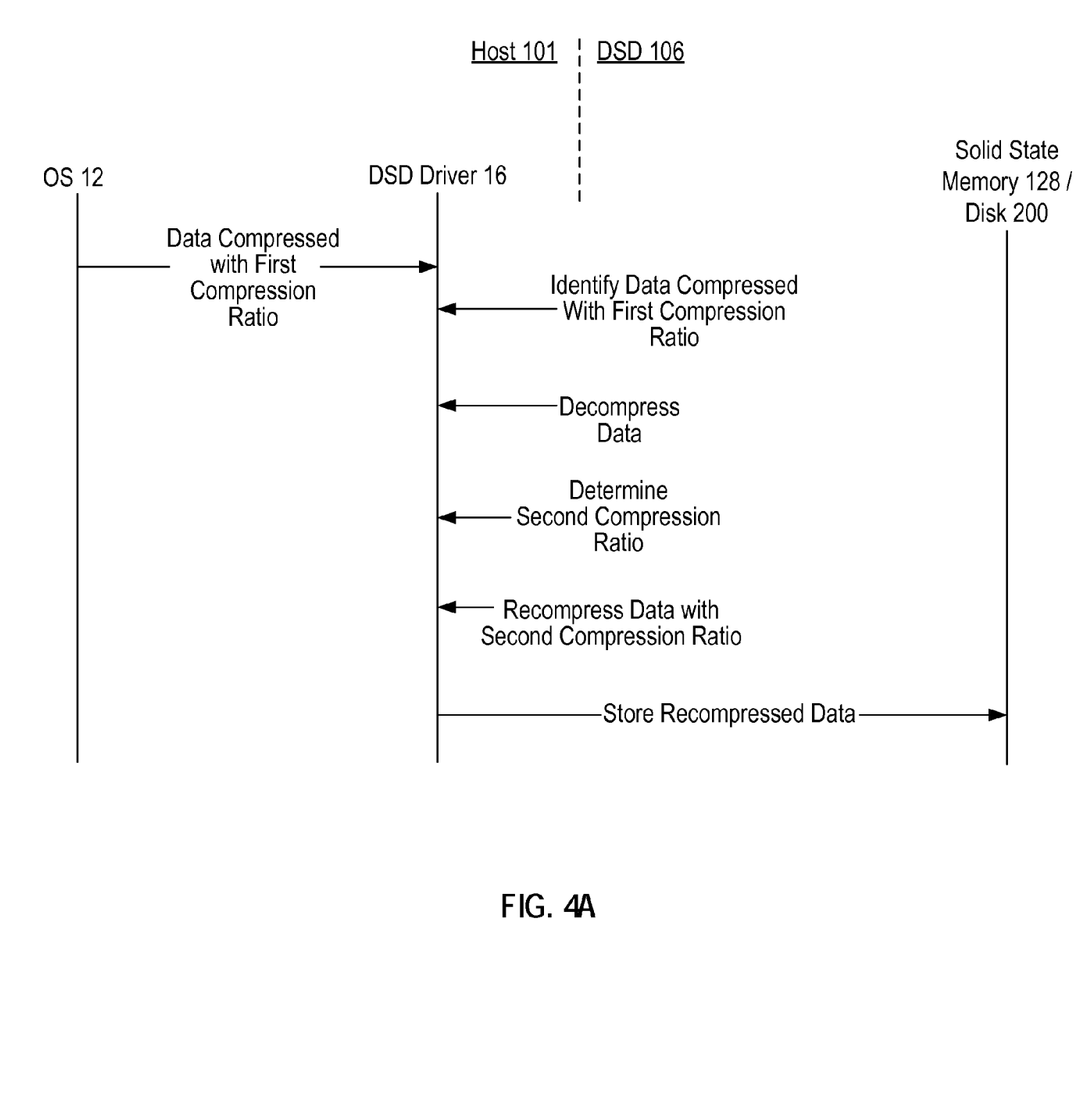
FIG. 4A is a sequence diagram for a recompression process performed by a host according to an embodiment.
Figure 4B:
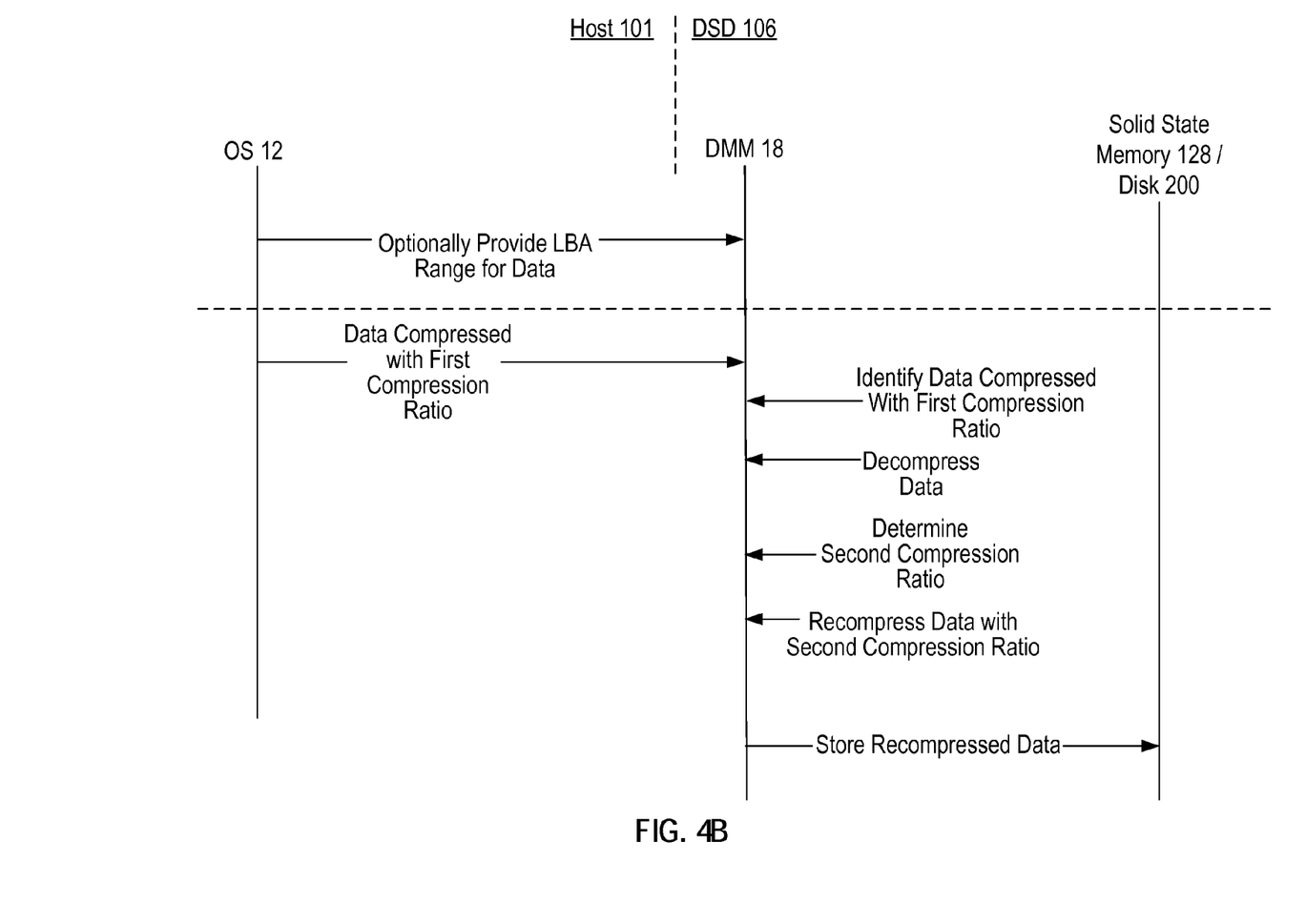
FIG. 4B is a sequence diagram for a recompression process performed by a DSD according to an embodiment.
Figure 5A:
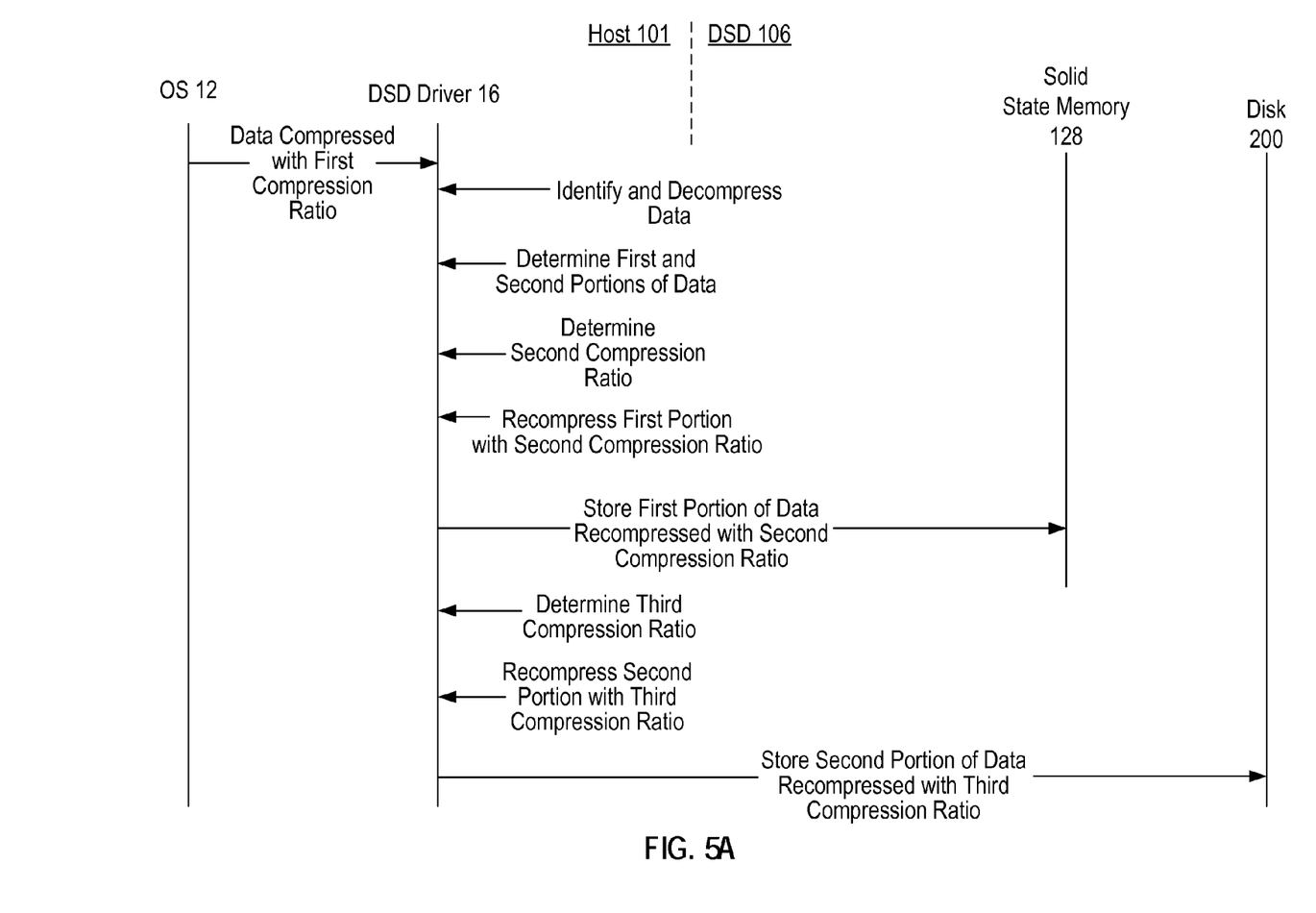
FIG. 5A is a sequence diagram for a recompression process performed by a host for storing data on different types of non-volatile memory (NVM) according to an embodiment.
Figure 5B:
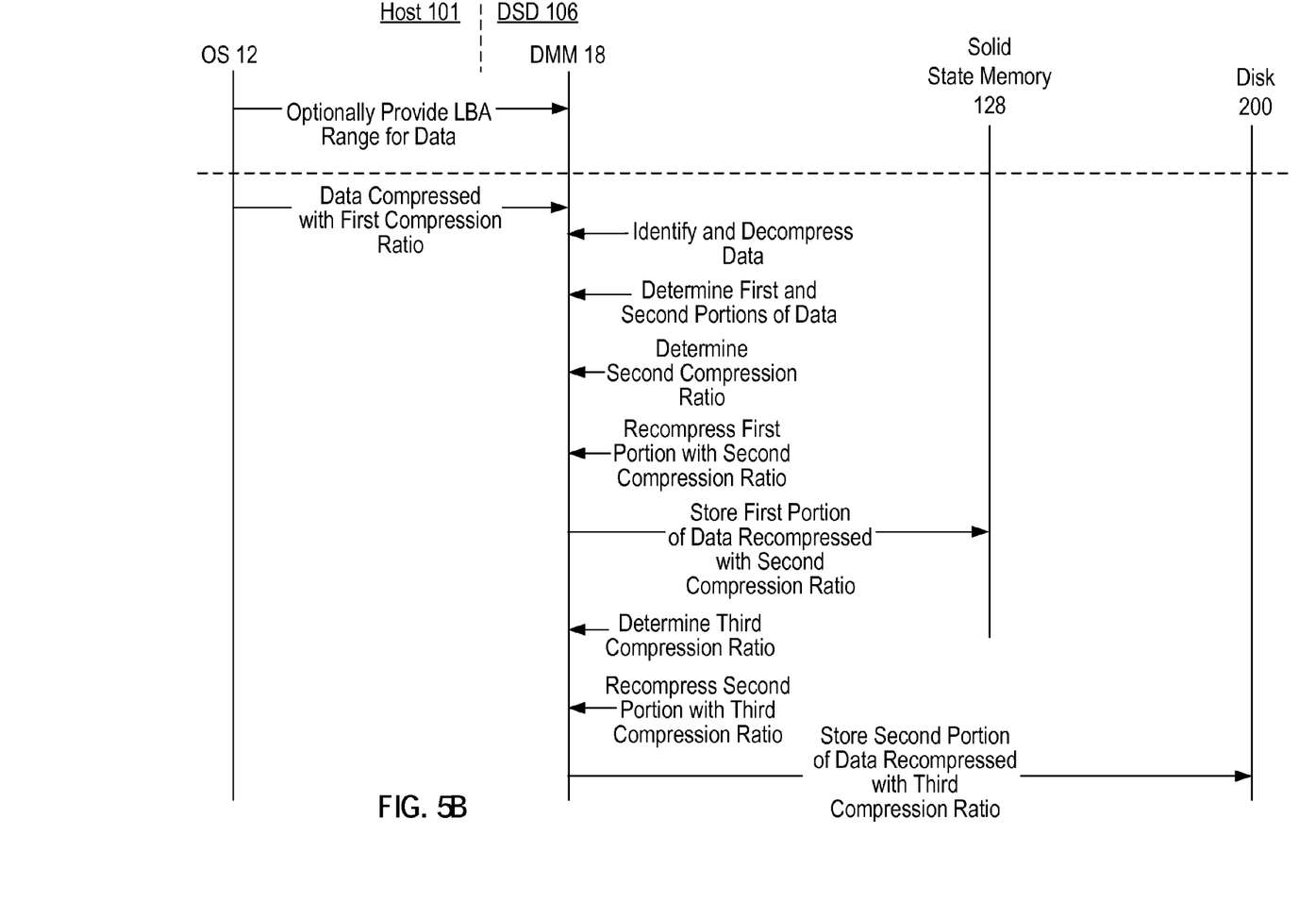
FIG. 5B is a sequence diagram for a recompression process performed by a DSD for storing data on different types of NVM according to an embodiment.

FIG. 3 is a flowchart for a recompression process which can be performed by host 101 and/or DSD 106. In the examples of FIGS. 4A and 5A described below, the process of FIG. 3 is primarily performed by CPU 108 of host 101 when executing DSD driver 16. In the examples of FIGS. 4B and 5B described below, the process of FIG. 3 is primarily performed by controller 122 when executing DMM 18.

Returning to FIG. 3, the recompression process begins in block 300 with a command from host 101 to store data in an NVM (e.g., disk 200 and solid state memory 128) of DSD 106. For example, such a command can come from host 101 during a hibernate process performed by OS 12. In this example, OS 12 commands DSD 106 to store hibernate data 10 in an NVM of DSD 106.

In block 302, data compressed with a first compression ratio is identified for recompression. The data compressed with the first compression ratio can include hibernate data 10 after it has been compressed by OS 12 with a first compression ratio during a hibernation process.

In block 304, the data identified in block 302 is decompressed and a second compression ratio is determined in block 306 based on a time to restore data to RAM 110 of host 101 and based on characteristics of the NVM (e.g., disk 200 and/or solid state memory 128). For example, the first compression ratio can be a relatively high compression ratio used by OS 12 when storing hibernate data 10 to solid state memory 128. The second compression ratio can then be determined in block 306 to be a relatively high compression ratio but less than the first compression ratio so as to decrease a time required to decompress hibernate data 10 after it has been recompressed with the second compression ratio.

On the other hand, the first compression ratio can be a relatively low compression ratio used by OS 12. The second compression ratio can then be determined in block 306 to be greater than the first compression ratio so as to reduce a size of hibernate data 10 and reduce wear of solid state memory 128. However, the greater compression of the second compression ratio is balanced in block 306 against the time to restore hibernate data 10 to RAM 110 after decompression. By considering the time to restore hibernate data 10 to RAM 110, it is ordinarily possible to avoid an undesirably long resumption process after hibernation while still reducing wear on solid state memory 128.

In another example, the first compression ratio can be a relatively high compression ratio for storing hibernate data 10 to solid state memory 128. After considering characteristics of the available NVM of DSD 106 and the time to restore hibernate data 10 to RAM 110, the second compression ratio may be determined to be much lower than the first compression ratio to store hibernate data 10 on disk 200 instead of in solid state memory 128. Characteristics of the available NVM, such as a small available capacity of solid state memory 128 and a time to ready of disk 200, may allow for a quicker restoration of hibernate data 10 by using disk 200 instead of solid state memory 128. In other words, if solid state memory 128 has only a small area available for storing hibernate data 10, a high compression ratio for hibernate data 10 to reduce wear of solid state memory 128 might cause the time to restore hibernate data 10 from solid state memory 128 to exceed the time to restore hibernate data 10 from disk 200 with a much lower compression ratio despite the longer time to ready of disk 200.

By determining the second compression ratio in block 306, host 101 or DSD 106 can dynamically adjust the compression of data based on a time to restore data to RAM 110 and characteristics of solid state memory 128 and/or disk 200. In determining the second compression ratio, the time to restore data to RAM 110 may be based on a processing speed of CPU 108 for decompressing the data and/or a transfer rate for the data between host 101 and DSD 106. For example, a higher processing speed of CPU 108 can favor a higher second compression ratio while a higher transfer rate can favor a lower compression ratio. Such time to restore factors can be considered independently or in combination when determining the second compression ratio.

FIG. 4A is a sequence diagram for an example recompression process primarily performed by CPU 108 with DSD driver 16. As shown in FIG. 4A, OS 12 sends data compressed with a first compression ratio to DSD driver 16, which then identifies and decompresses the data compressed with the first compression ratio. DSD driver 16 determines a second compression ratio and recompresses the data with the second compression ratio. In recompressing the data, DSD driver 16 may use the same compression algorithm used by OS 12 or can use a different compression algorithm to further improve use of the NVM of DSD 106. DSD driver 16 then sends a command to DSD 106 to store the data recompressed with the second compression ratio in NVM of DSD 106 such as solid state memory 128 and/or disk 200.

FIG. 4B is a sequence diagram for an example recompression process performed by controller 122 of DSD 106 with DMM 18. By shifting much of the recompression process from host 101 to DSD 106, it is ordinarily possible to achieve a higher system performance by freeing resources of host 101. As shown in FIG. 4B, OS 12 may optionally provide a logical block address (LBA) range to DMM 18 to help in identifying data compressed with the first compression ratio. In the example of a hibernation process, the LBA range can be an LBA range used by host 101 for addressing data associated with the hibernation process. After DMM 18 has received the LBA range from host 101, future write or read requests including LBAs within the range can be treated as hibernate data. If DMM 18 is not provided with an LBA range in advance, other methods for identifying the data compressed with the first compression ratio can be used such as metadata indicating that the received data is associated with a particular process performed by host 101 such as a crash dump process or a hibernate process.

After DMM 18 receives and identifies the data compressed with the first compression ratio, DMM 18 decompresses the data. A second compression ratio is then determined based on characteristics of the NVM of DSD 106 and a time to restore the data to RAM 110 of host 101. DMM 18 then recompresses the data using the second compression ratio and stores the recompressed data in solid state memory 128 and/or disk 200. As with the example of FIG. 4A, the decompressed data can be recompressed using the same compression algorithm used by OS 12 or with a different compression algorithm.

FIG. 5A is a sequence diagram for an example recompression process performed by CPU 108 of host 101 with DSD driver 16. One way the process of FIG. 5A differs from the process of FIG. 4A is that DSD driver 16 further determines a first portion of the data for storage in solid state memory 128 and determines a second portion of the data for storage on disk 200. As with FIG. 4A, the process of FIG. 5A begins with DSD driver 16 receiving data from OS 12 that is compressed with the first compression ratio. DSD driver 16 then identifies and decompresses the data received from OS 12. DSD driver 16 also determines first and second portions of the data for storage in solid state memory 128 and disk 200, respectively. In determining the first and second portions of the data, DSD driver 16 may consider a time to restore the data to RAM 110 and characteristics of solid state memory 128 and disk 200.

For example, DSD driver 16 may determine a first portion of hibernate data 10 for storage in solid state memory 128 such that the time to restore the first portion of hibernate data 10 is approximately the same amount of time it would take to begin receiving data at CPU 108 from disk 200 after spinning up. By storing only an initial portion of hibernate data 10 in solid state memory 128, the effect of a "spin up" delay associated with a conventional disk drive can be reduced. In addition, by splitting hibernate data 10 between solid state memory 128 and disk 200, wear on solid state memory 128 can be reduced since less data is stored in solid state memory 128.

In FIG. 5A, a second compression ratio is determined based on a time to restore the data compressed with the first compression ratio to RAM 110 and characteristics of solid state memory 128. DSD driver 16 recompresses the first portion of the data with the second compression ratio and commands DSD 106 to store the first portion of the data recompressed with the second compression ratio in solid state memory 128.

A third compression ratio is determined by DSD driver 16 for storing the second portion of the data on disk 200. In this regard, the third compression ratio can be a lower compression ratio than the second compression ratio since disk 200 is not susceptible to the wear issues of solid state memory 128. By storing the second portion of the data using a lower compression ratio, the time to restore the data to RAM 110 can ordinarily be reduced. DSD driver 16 then commands DSD 106 to store the second portion of the data recompressed with the third compression ratio on disk 200.

FIG. 5B is a sequence diagram for an example recompression process performed by controller 122 of DSD 106 with DMM 18. The description of the process of FIG. 5B is substantially similar to the description of the process of FIG. 5A with the exception that DMM 18 performs the process of FIG. 5B instead of DSD driver 16. In addition, and as shown in FIG. 5B, OS 12 can optionally provide DMM 18 with an LBA range for identifying the data compressed with the first compression ratio as described above with reference to FIG. 4B.

Figure 6:
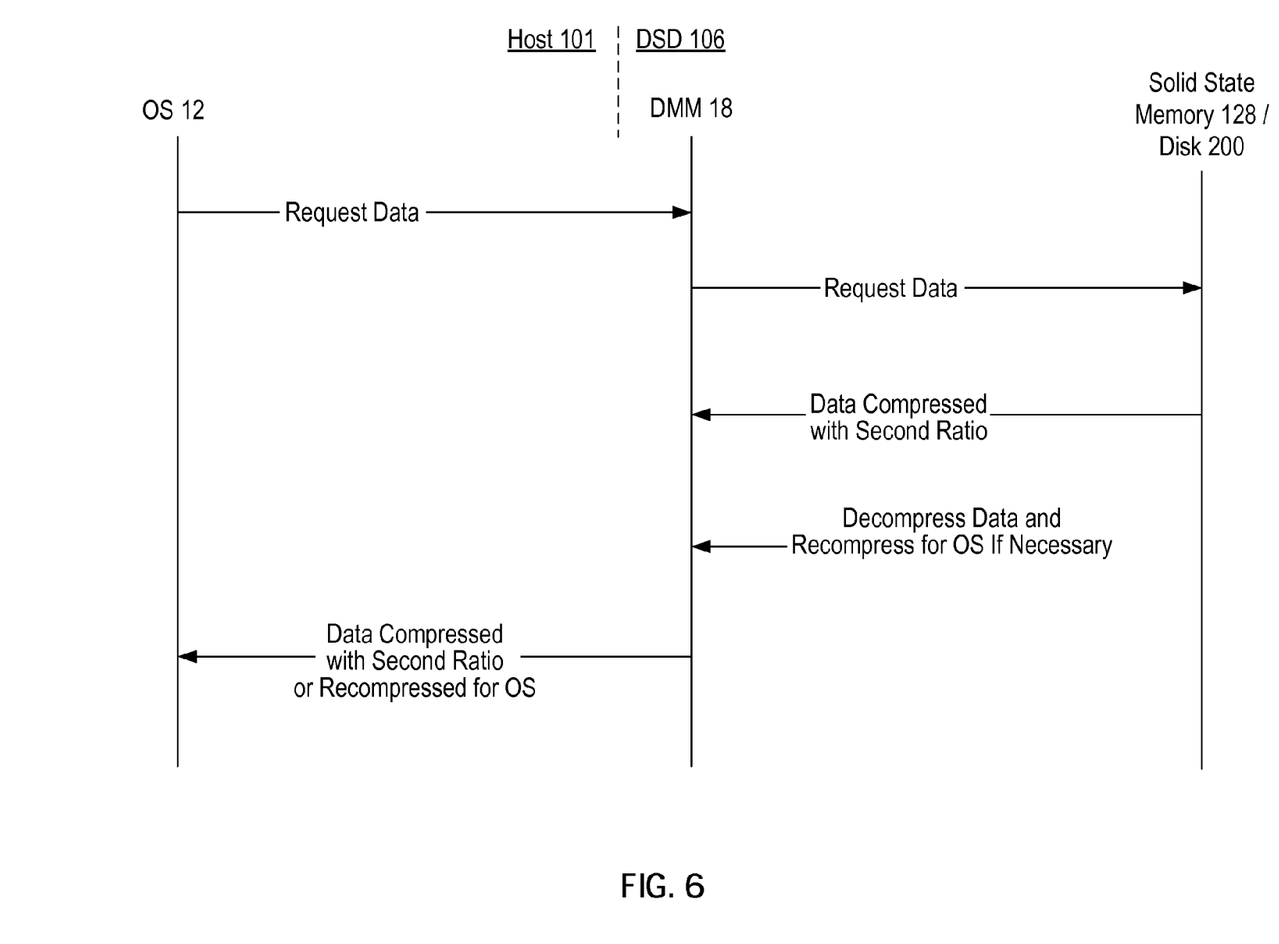
FIG. 6 is a sequence diagram for retrieval of data according to an embodiment.

FIG. 6 is a sequence diagram for an example retrieval of data from DSD 106 which has been recompressed with the second compression ratio. As shown in FIG. 6, OS 12 requests data from DSD 106, such as hibernate data 10. Since DSD 106 has previously stored the requested data in solid state memory 128 and/or disk 200, DMM 18 can recognize the requested data as being compressed with the second compression ratio based on the LBAs of the requested data.

DMM 18 requests the data from solid state memory 128 and/or disk 200 and receives the data recompressed with the second compression ratio. DMM 18 may then either pass the requested data back to host 101 for decompression by OS 12 or may decompress the data and recompress it for compatibility with OS 12. In more detail, if the data was recompressed using a compression algorithm used by OS 12, the recompressed data can be sent directly to OS 12 even though the second compression ratio is different from the first. On the other hand, if a different compression algorithm was used to recompress the data, DMM 18 decompresses the data and recompresses the data using the same compression algorithm used by OS 12. The data compressed with the second compression ratio or recompressed for OS 12 is then sent from DMM 18 to host 101 for decompression by OS 12.

Figure 7:
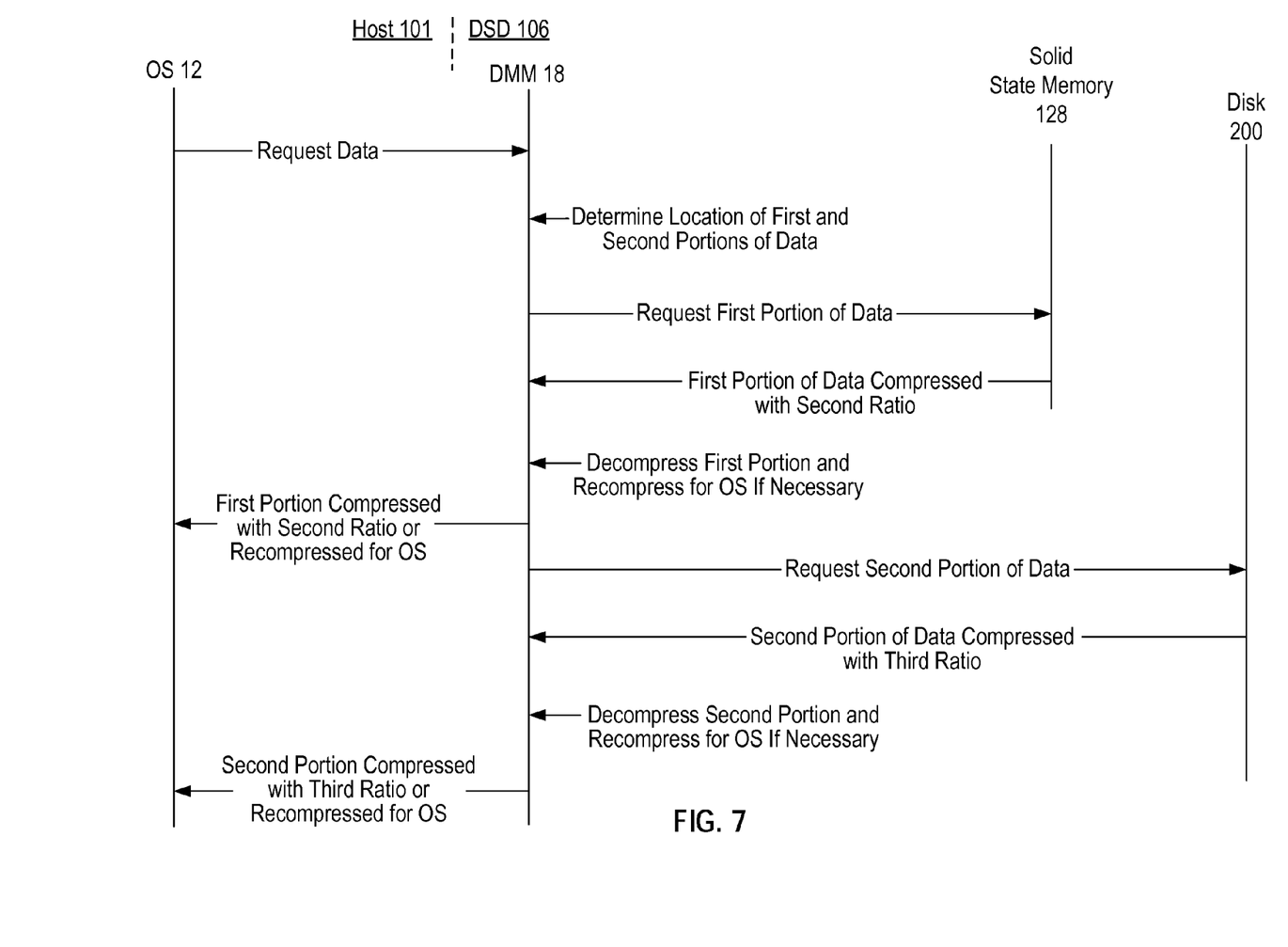
FIG. 7 is a sequence diagram for retrieval of data from different types of NVM according to an embodiment.

FIG. 7 is a sequence diagram for an example retrieval of data from DSD 106 where a first portion of the data has been stored in solid state memory 128 using a second compression ratio and a second portion of the data has been stored on disk 200 using a third compression ratio. As discussed above with reference to FIG. 5A, splitting the data into first and second portions for storage in different types of NVM can allow for a quicker resume time while reducing wear on a solid state memory.

As shown in FIG. 7, OS 12 requests data from DSD 106 and DMM 18 determines the locations of the first and second portions of the requested data. DMM 18 then requests the first portion of the data from solid state memory 128. After receiving the requested first portion, DMM 18 can either send the first portion of the data to host 101 for decompression by OS 12 or DMM 18 can decompress the first portion and recompress it for compatibility with the compression algorithm used by OS 12. Even though the second compression ratio is different from the first compression ratio, OS 12 can still decompress the first portion if it was recompressed using the same compression algorithm used by OS 12.

In the example of FIG. 7, DMM 18 requests the second portion of the data from disk 200. After receiving the second portion of the data from disk 200, DMM 18 can send the second portion of the data to host 101 for decompression by OS 12 or can decompress the second portion and recompress it for compatibility with OS 12. The second portion of the data compressed with the third compression ratio can be sent to host 101 for decompression by OS 12 if the same compression algorithm was used in recompressing the second portion as is used by OS 12.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A method for storing data from a volatile memory of a host in a non-volatile memory (NVM) of a data storage device (DSD), the method comprising:
   identifying data from the volatile memory of the host which has been compressed with a first compression ratio;
   decompressing the identified data;
   determining a second compression ratio based on a time to restore the data to the volatile memory of the host and characteristics of the NVM;
   recompressing at least a portion of the decompressed data with the second compression ratio during a hibernation process;
   storing at least a portion of the data recompressed with the second compression ratio in the NVM; and
   in response to a request from the host for the stored data when resuming from hibernation after the hibernation process:
   decompressing, by the DSD, the stored data; and
   recompressing, by the DSD, the decompressed stored data using a compression algorithm used by an operating system of the host.

2. The method of claim 1, wherein the second compression ratio is determined to be less than the first compression ratio so as to decrease a time required to decompress the recompressed data.

3. The method of claim 1, wherein the time to restore the data to the volatile memory is based on a processing speed of the host and/or a transfer rate of data between the host and the DSD.

4. The method of claim 1, wherein the NVM is a solid state memory and the second compression ratio is determined to be greater than the first compression ratio so as to reduce a size of the recompressed data in the NVM and reduce wear of the NVM.

5. The method of claim 1, wherein the data compressed with the first compression ratio is identified using a logical block address range provided by the host.

6. The method of claim 1, wherein the data compressed with the first compression ratio is identified during the hibernation process.

7. The method of claim 1, wherein the NVM is a solid state memory and the DSD further includes magnetic recording media.

8. The method of claim 7, wherein a first portion of the data recompressed with the second compression ratio is stored in the NVM, and wherein the method further comprises storing a second portion of the data recompressed with the second compression ratio on the magnetic recording media.

9. The method of claim 7, wherein a first portion of the decompressed data is recompressed with the second compression ratio, and wherein the method further comprises:
   recompressing a second portion of the decompressed data with a third compression ratio; and
   storing the data recompressed with the third compression ratio on the magnetic recording media.

10. The method of claim 7, wherein the magnetic recording media includes a rotating magnetic disk for storing data, and wherein the method further comprises determining a first portion of the decompressed data for storage in the solid-state memory based on an amount of time to begin receiving data from the rotating magnetic disk after spinning up.

11. The method of claim 1, wherein the compression algorithm used by the operating system of the host is used by the host to compress the data with the first compression ratio.

12. The method of claim 1, wherein in response to the request from the host for the stored data when resuming from hibernation after the hibernation process, the method further comprises sending the recompressed stored data to the host.

13. A data storage device (DSD), comprising:
   a non-volatile memory (NVM) for storing data; and
   a controller configured to:
      identify data from a volatile memory of a host which has been compressed with a first compression ratio;
      decompress the identified data;
      determine a second compression ratio based on a time to restore the data to the volatile memory of the host and characteristics of the NVM;
      recompress at least a portion of the decompressed data with the second compression ratio during a hibernation process;
      store at least a portion of the data recompressed with the second compression ratio in the NVM; and
      in response to a request from the host for the stored data when resuming from hibernation after the hibernation process:
         decompress the stored data; and
         recompress the decompressed stored data using a compression algorithm used by an operating system of the host.

14. The DSD of claim 13, wherein the controller determines the second compression ratio to be less than the first compression ratio so as to decrease a time required to decompress the recompressed data.

15. The DSD of claim 13, wherein the time to restore the data to the volatile memory of the host is based on a processing speed of the host and/or a transfer rate of data between the host and the DSD.

16. The DSD of claim 13, wherein the NVM is a solid state memory and the controller determines the second compression ratio to be greater than the first compression ratio so as to reduce a size of the recompressed data in the NVM and reduce wear of the NVM.

17. The DSD of claim 13, wherein the controller identifies the data compressed with the first compression ratio using a logical block address range provided by the host.

18. The DSD of claim 13, wherein the controller identifies the data compressed with the first compression ratio during the hibernation process.

19. The DSD of claim 13, wherein the NVM is a solid state memory and the DSD further comprises magnetic recording media.

20. The DSD of claim 19, wherein a first portion of the data recompressed with the second compression ratio is stored in the NVM, and wherein the controller is further configured to store a second portion of the data recompressed with the second compression ratio on the magnetic recording media.

21. The DSD of claim 19, wherein a first portion of the decompressed data is recompressed with the second compression ratio, and wherein the controller is further configured to:
   recompress a second portion of the decompressed data with a third compression ratio; and
   store the data recompressed with the third compression ratio on the magnetic recording media.

22. The DSD of claim 19, wherein the magnetic recording media includes a rotating magnetic disk for storing data, and wherein the controller is further configured to determine a first portion of the decompressed data for storage in the solid-state memory based on an amount of time to begin receiving data from the rotating magnetic disk after spinning up.

23. The DSD of claim 19, wherein the compression algorithm used by the operating system of the host is used by the host to compress the data with the first compression ratio.

24. The DSD of claim 13, wherein in response to the request from the host for the stored data when resuming from hibernation after the hibernation process, the controller is further configured to send the recompressed stored data to the host.

25. A non-transitory computer-readable medium storing computer-executable instructions for storing data from a volatile memory of a host in a non-volatile memory (NVM) of a data storage device (DSD), wherein when the computer-executable instructions are executed by a controller, the instructions cause the controller to:
   identify data from the volatile memory of the host which has been compressed with a first compression ratio;
   decompress the identified data;
   determine a second compression ratio based on a time to restore the data to the volatile memory of the host and characteristics of the NVM of the DSD;

recompress at least a portion of the decompressed data with the second compression ratio for storage in the NVM during a hibernation process; and in response to a request from the host for the stored data when resuming from hibernation after the hibernation process:

decompress, by the DSD, the stored data; and recompress, by the DSD, the decompressed stored data using a compression algorithm used by an operating system of the host.

26. The non-transitory computer-readable medium of claim 25, wherein in response to the request from the host for the stored data when resuming from hibernation after the hibernation process, the instructions further cause the controller to send the recompressed stored data to the host.

\* \* \* \* \*